United States Patent [19]

Wolf et al.

[11] 4,039,222
[45] Aug. 2, 1977

[54] VEHICLE SUN ROOF

[75] Inventors: Ernest Wolf, St. Louis; John L. Cain, St. Charles, both of Mo.

[73] Assignee: Sky-Top Sunroofs, Ltd., Clayton, Mo.

[21] Appl. No.: 623,919

[22] Filed: Oct. 20, 1975

[51] Int. Cl.² ............................................. B60J 7/04
[52] U.S. Cl. .................................................. 296/137 E
[58] Field of Search ........... 296/137 E, 137 F, 137 G, 296/137 H

[56] References Cited

U.S. PATENT DOCUMENTS

| | | | |
|---|---|---|---|
| 3,033,608 | 5/1962 | Golde | 296/137 E |
| 3,066,976 | 12/1962 | Rehmann | 296/137 E |
| 3,290,087 | 12/1966 | Werner | 296/137 E |
| 3,737,194 | 6/1973 | Lutz | 296/137 E |
| 3,806,186 | 4/1974 | Mauron | 296/137 G |
| 3,863,979 | 2/1975 | Bienert | 296/137 G |

*Primary Examiner*—Robert R. Song

*Attorney, Agent, or Firm*—Sidney B. Ring; Hyman F. Glass

[57] ABSTRACT

This invention relates to a vehicle sun roof, preferably transparent or translucent such as glass or plastic, which contains the following characteristics:

1. a frontal bar for aligning the sun roof cover which is an integral part of the cover frame;
2. hingeable means for raising, sealing and locking the cover when in a closed position, and conversely hingeably lowering the cover during opening;
3. means for moving the cover forward and rearward with a minimum of visibility by means of a separate rear crossmember; the crossmember having slidable control cams attached at each end to control the upward movement of the cover rear edge;
4. a sun roof housing with a minimum loss of vehicle headroom;
5. a safety switch for shutting off the motor which is activated when an increased torque is exerted on a rotatable motor housing due to resistance to motion of the cover.

9 Claims, 7 Drawing Figures

VEHICLE SUN ROOF

In sliding roof covers constructed of glass heretofore known, part of the mechanism which is used to either attach the glass cover and its framework to the vehicle roof, or that used to control the positioning of the glass cover and its framework in relation to the vehicle roof, is located under the glass cover in a manner requiring the use of a decorative frame on the underside of the glass cover to hide said mechanism. The use of such a decorative frame not only reduces the viewing area through the glass, but it also necessitates the deepening of the sliding cover housing which is made part of the vehicle roof, so as to accommodate the decorative frame as well as the glass cover in their open position. This deepening of the housing may impinge as much as one inch or more into the headroom of the vehicle's passenger compartment, beyond the normal impingement of a housing for a similarly operating sliding steel cover equipped vehicle.

The present invention provides a rigid sliding cover for an opening in the roof of a vehicle and, more particularly, provides a sliding glass cover that will permit maximum viewing area from inside the vehicle when the cover is in its closed position and will provide minimum loss of headroom under the roof of the vehicle.

The present invention also provides a sliding glass cover for a vehicle roof opening, where said glass cover has minimal metal framing and where the front points of attachment and positioning control are an integral part of the front frame member and are readily adjustable and serviceable with the cover in place, and not in need of hiding with a full decorative internal frame.

The present invention further provides a means of moving a sliding cover between two guide rails positioned longitudinally in the housing which is attached to the underside of the vehicle roof, said means positioned in the rear of the housing in a manner that allows the glass cover to be moved rearward and forward without said means being visible at any time within the roof opening whether the glass cover is in an open or closed position. Said means is to require no adjustments following installation on the guide rails, is to provide exceptionally long service-free operation of the sliding cover, and is to be compatible with a variety of modes of applying force to said means. Said means is to be comprised of a cross member (shuttle) separate from the sliding cover and rearward of it, said shuttle attached at each outer end to the guide rails by means of a rear glide plate, and rear glide plates hingably linked to and attached to the rear edge of the sliding cover.

The present invention further provides means for adapting said hinge linkage to give upward force to the rear edge of the cover in the closing cycle, and downward force in the opening cycle; the hinge linkage is also to prevent concurrent pressure in a downward and rearward direction to be exerted on the rear edge of the sliding cover when the cover is in its fully closed position and the drive system is inactive.

The present invention further provides for the hinge linkage between the shuttle and the sliding cover to move the cover forward while providing means other than spring means to prevent an upward motion of the rear edge of the cover until said cover is in its fully closed position at its front edge; yet this same means also is to provide for controlling vertical motion of the rear edge of the glass cover.

A number of present sliding cover operative systems employ a slip-clutch device to limit the force that can be applied to the moving cover; such a slip-clutch is known to be difficult to adjust and to keep in adjustment. Another known operative system employing a screw drive relies on the movement of the gear box rearward against a pair of springs until a switch is tripped to limit forward movement, and has an effective safety switch device for the rearward motion of the cover only at the point where the cover is fully open; this latter system suffers from there being no effective safety shut off for the cover as it moves from a closed to an open position, and in that the gear train is under maximum stress, always at the same points, at all times that the cover is in a fully closed position.

In contrast, the present invention provides a means for stopping the movement of the cover when excessive force is required for continuing its movement in either direction, while at the same time having no force applied to the gear train when the panel is in its fully closed position, nor at any other time that the operative system is not activated. Thus the present invention provides for an improved means of stopping the movement of the cover when an event occurs which is likely to injure the operative system or a person if the cover movement were to continue.

This invention has the following major features and advantages.

1. It simplifies the attachment and positioning of the cover through the use of accessible yet inconspicuous fastening provisions, and by making the front transverse attachment bar an integral part of the glass frame support structure. The design permits a larger viewing area in proportion to cover size than heretofore possible.

The frontal bar facilitates attachment and positioning of the glass cover for optimum fit and operation. The simplicity and neatness of the design requires no decorative internal frame, and this in turn results in minimal loss of headroom upon installation.

2. By using a cross-member (shuttle), the glass cover operates with minimum visibility of the operating means in both the open and closed position. The cross member (shuttle) is separate from and rearward of the glass cover and is driven by a moving means such as a shaft. The glass cover supported on front and rear glider plates is moved over guide rails.

3. The shuttle is linked to rear glider plates which are hingeably linked to the cover so as to give an upward raising force to the cover in the closing cycle and downward lowering force in the opening cycle without the additional use of spring means.

4. A rear glider plate-cam combination causes the cover to raise on its hinges during the final closing cycle only and to lower on its hinges during the initial part of the opening cycle. This is effected by means of an L shaped rear glider plate having a top horizontal face and a side vertical face, the horizontal face having a hinge connection and the vertical face attached to a laterally moveable cam with an elastic means joining the cam to a point on the vertical face of the glider plate. The cam has a frontal notch for engaging a tab projecting from the cover.

5. The rear glider plate-cam combination is actuated in the closing mode when a cam stop contacts the front of the cam, stopping its forward motion. As the rear glider plate continues to move forward, the tab projecting from the cover escapes from the cam notch; the hinge between the rear glider plate and the rear cover support member, which is designed to have a natural tendency to force the rear cover edge upward, can push the cover up as soon as the tab escapes the notch. When the cam becomes stationary while the glider plate continues to move forward, a spring giving the cam a forward pull develops greater tension; in the opening mode, this tension keeps the cam stationary until the cover has dropped down vertically through a combination of pull by the hinge action and control by the vertical cam face on the tab projecting from under the cover. As soon as the tab has reentered the notch, it becomes possible for the cover to move rearward into the open position.

6. A feature which protects equipment and personal safety is a means for stopping the driving force when excessive force is required for continued operation of the cover. This is achieved by a motor-safety switch combination which comprises a rotatable motor and at least one shut-off switch. The motor is mounted so as to be non-rotatable until a predetermined torque is reached. The motor rotates when the predetermined torque is exceeded so as to activate a shut-off switch. The torque set of the motor may be effected by an elastic means such as by means of springs.

The operation of the present invention may be summarized as follows:

1. An opening is made in the roof of the vehicle.
2. The housing is installed under the roof so that the cover corresponds to the opening.
3. The front transverse attachment bar vertically aligns the cover with the car roof and horizontally aligns the cover with the guide rails through the front guide plates.
4. In position, the motor, via a gear box, drives the shuttle bar, which is rearward of the cover, by means of a drive shaft.
5. The shuttle is attached to a rear glide plate-cam combination which is hingeably attached to the rear of the cover.
6. As the cover closes, the rear glide plate-cam combination contacts a cam stop which releases the retaining tab from the cam and it moves upward and hingeably closes the cover.
7. In closing, a front glider tab lowers the wind deflector into the housing.
8. Opening is the reverse of the closing operation.
9. As a safety feature, if resistance is met in opening or closing, an increased torque is exerted on the motor housing and a shut-off switch is contacted.
10. Under the glass cover is a manually-operated headliner frame which can be opened and closed to cut off light from the cover.

Without intending thereby to limit the broader scope of the invention but for purposes of illustration, the preferred embodiment of the invention is shown in the accompanying drawings, wherein FIG. 1 is a perspective overall view of the invention set in the vehicle roof.

FIG. 3 shows the cover in a closed position and FIG. 4 in an open position.

FIG. 6 shows the switch in an on-position and FIG. 7 the off-position.

Figure 1:
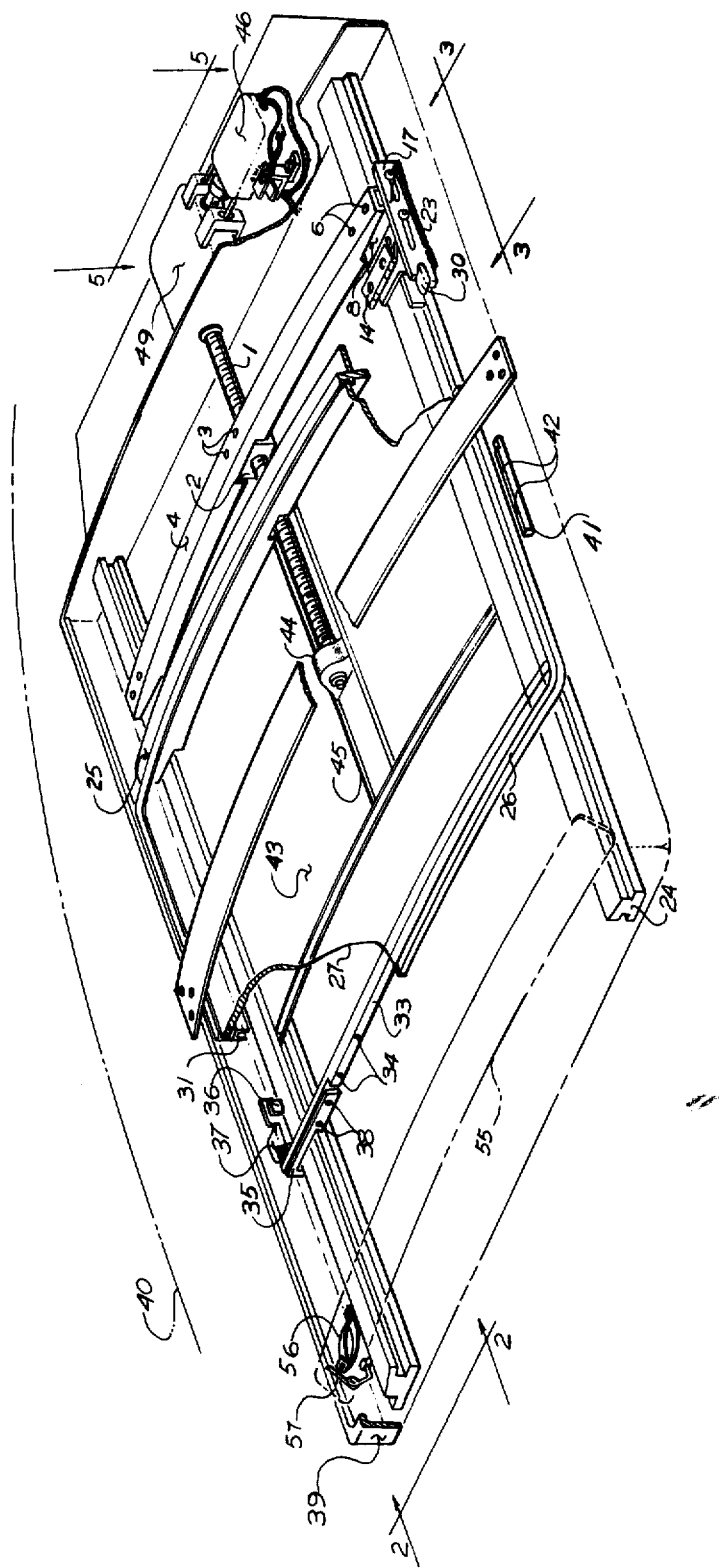

All of the components shown in the drawing are presented in Table I listing a catalogue of components with the designated numeral and each numeral will indicate the same componenet in all figures. All numerals will be shown in the overall view of the invention of FIG. 1 unless it is difficult to do so, wherein it will be shown in another appropriate figure. If not indicated by a numeral in FIG. 1, the figure in which the component is shown and indicated with a numeral is specified in the Catalogue shown in Table I and in the description of the preferred embodiment. In order not to burden the drawing with excessive numerals and if the identification of the component is evident from companion drawings such as FIGS. 3 and 4 and FIGS. 5 and 6, the numeral designation will be omitted in one of the drawings.

Table I

| | |
|---|---|
| 1. | externally threaded shaft |
| 2. | internally threaded drive nut |
| 3. | drive nut fastening screws |
| 4. | shuttle bar |
| 5. | shuttle spacer block (FIG. 4) |
| 6. | shuttle block fastening screws |
| 7. | shuttle alignment plate (FIG. 4) |
| 8. | rear glider plate |
| 9. | shuttle centering slot (FIG. 3) |
| 10. | shuttle centering screw (FIG. 3) |
| 11. | hinge attachment slots (FIG. 4) |
| 12. | Hinge attachment screws (FIG. 4) |
| 13. | hinge attachment nuts (FIG. 4) |
| 14. | three-section double hinge |
| 15. | rear glide blocks (FIG. 3) |
| 16. | spring retaining tab (FIG. 4) |
| 17. | sliding cam |
| 18. | cam slide slots (FIG. 3) |
| 19. | cam control face (FIG. 4) |
| 20. | cam control notch (FIG. 4) |
| 21. | cam slide pins (FIG. 4) |
| 22. | spring attachment pin (FIG. 4) |
| 23. | cam spring |
| 24. | guide rail |
| 25. | rear seal support |
| 26. | metal frame for glass |
| 27. | glass cover |
| 28. | rear glass support (FIG. 3) |
| 29. | rear hold-down arm (FIG. 3) |
| 30. | rear hold-down tab |
| 31. | side glass support |
| 32. | front glass support (FIG. 2) |
| 33. | front transverse attachment bar |
| 34. | panel front vertical adjustment screws |
| 35. | front glider plate |
| 36. | front glide blocks |
| 37. | wind deflector spring depressor tab |
| 38. | panel front horizontal adjustment screws |
| 39. | sunroof housing |
| 40. | vehicle roof |
| 41. | cam stop |
| 42. | cam stop adjustment screws |
| 43. | headliner frame |
| 44. | plastic follow block |
| 45. | follow block guide |
| 46. | motor |
| 47. | motor drive shaft (FIG. 5) |
| 48. | motor retention pins (FIGS. 5, 6, 7) |
| 49. | gear box |
| 50. | drive gear shaft (FIG. 5) |
| 51. | spring retainers (FIGS. 5, 6, 7) |
| 52. | control springs (FIG. 6) |
| 53. | switch tab (FIG. 6) |
| 54. | limit switches (FIGS. 5, 6, 7) |
| 55. | wind deflector |
| 56. | wind deflector spring |
| 57. | wind deflector spring stop |

DESCRIPTION OF PREFERRED EMBODIMENT

As a normal matter of sliding roof cover installation, the glass panel cover 27 is provided with a housing 39 attached to the underside of a vehicle roof 40, said housing being provided with guide rails 24 fastened to the outer edges of the opening in the housing and extending rearward to the rear edge of the housing.

Figure 2:
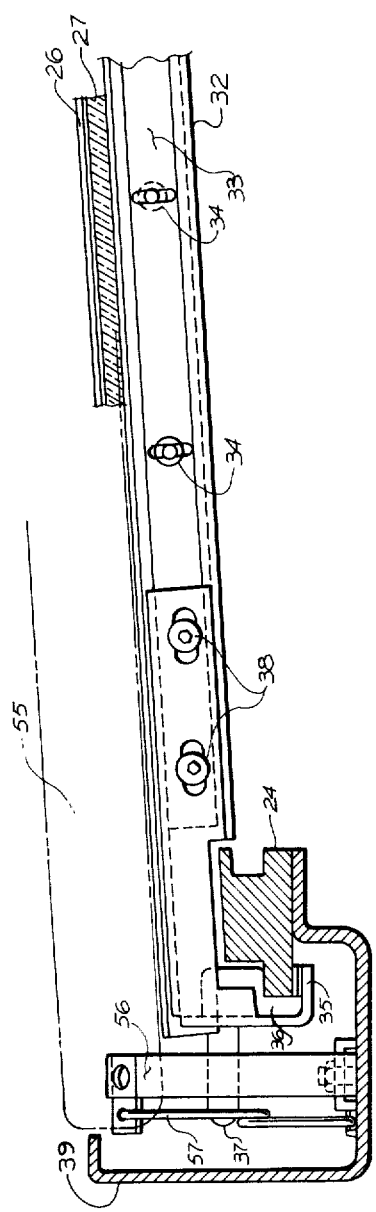
FIG. 2 is a frontal view of FIG. 1 in the direction of arrows 2—2 showing details of the front transverse attachment bar, front glider plate and front support member.

In a preferred embodiment of the invention, the glass panel cover 27 is framed on its upper and outer edge with a metal frame 26, said frame being connected on all four sides to metal reinforcing members which support the glass on its lower edges 28 (FIG. 3), 31, 32 (FIG. 2). A front transverse attachment bar 33 is made part of the front support member 32 (FIG. 2). This bar 33 has internally threaded holes on its rear face at four fairly evenly laterally spaced locations to permit attachment with screws 34 to the front support member. Said front support member has vertically slotted holes for the bar attachment screws 34 to allow for vertical adjustment of the installed cover to permit alignment of the cover's front edge with the car roof, with the cover in its closed position. The front transverse attachment bar also has internally threaded holes on its front face at two locations at each end for panel front horizontal adjustment screws 38; at these front locations are attached front guide plates 35 having an L-shape with a leg parallel to the front transverse attachment bar and having horizontal slots for screw attachment to said bar with cover centering screws 38; the front guide plates 35 also have a leg parallel to the guide rail 24, having on its inward side two plastic glide blocks 36 which engage the outward edge of the guide rail and on an outward projection a plastic tab 37 used to depress a wind deflector spring 56 (which is attached to wind deflector 55 and wind deflector spring stop 57) as the front guide plate moves from an open to a closed position. The horizontal slots in the front glider plate permits centering the front edge of the cover while the cover is installed and in a nearly closed position. While the front transverse attachment bar, support structure and screws may be fabricated of materials having attractive finishes, the bar and adjacent support structure surfaces may also be covered with a U-shaped trim strip without encroaching on a normal housing depth or on the glass viewing area within the minimum glass framework.

To the rear frame edge and rear support members 28 (FIG. 3) is attached a rearward projecting rear seal support 25. To the underside of this rear seal support 25, at each outer end and in a location above the guide rails, are attached a three-section hinge 14 so that the uppermost hinge section points away from the rear cover edge and the lowermost hinge section also points away from the rear cover edge. The lower hinge section is attached to a rear glider plate 8 which is attached to a cross member or shuttle 4. The lower hinge section is attached with hinge attachment screws 12 (FIG. 4) and nuts 13 (FIG. 4) to the rear glider plate 8, and lateral hinge attachment slots 11 (FIG. 4) in the lower hinge section permit lateral adjustment of the rear edge of the cover into the center of the roof opening. Vertical adjustment of the rear cover edge is achieved by adjustment of the section of the housing to which the guide rail is attached at the rear of the roof opening; proper vertical spacing between the guide rail and the roof surface, and consistent assembly of the parts attached to the cover, will assure a flush fit of the fully closed cover with the car roof at the cover's rear edge, without further adjustment.

Figure 3:
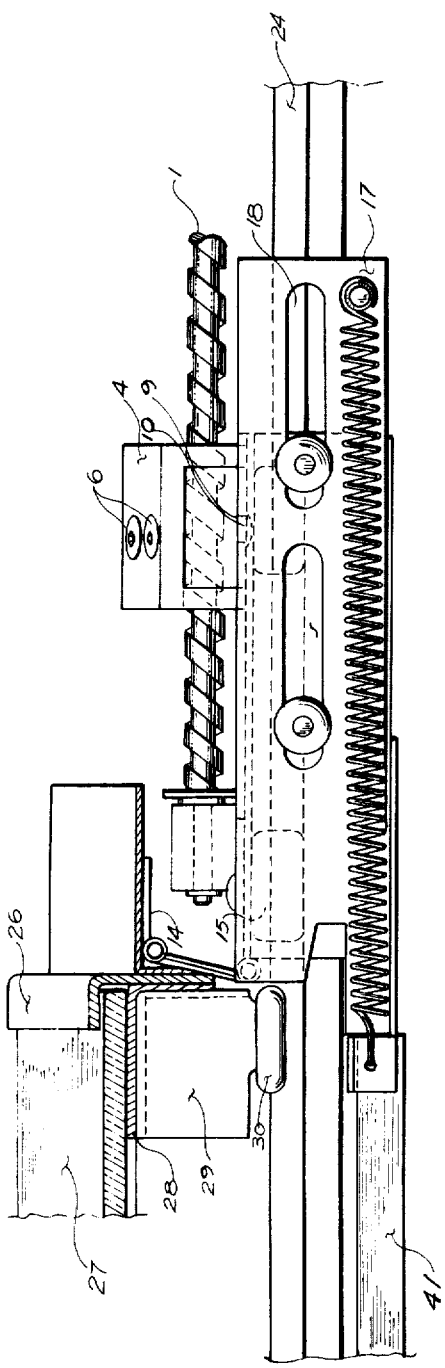
FIG. 3 and FIG. 4 are side views of FIG. 1 in the direction of arrows 3—3 showing the details of the glass cover in relation to the hinge, cam, tab and cam stop.
Figure 4:
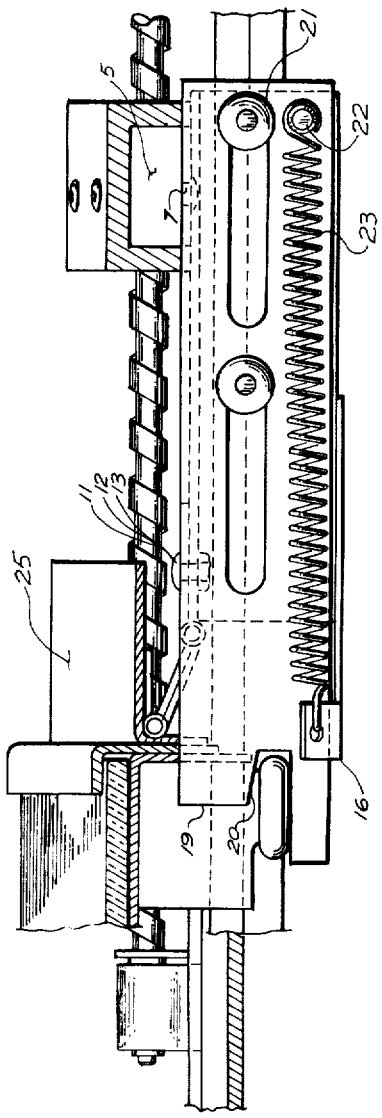
Figure 5:
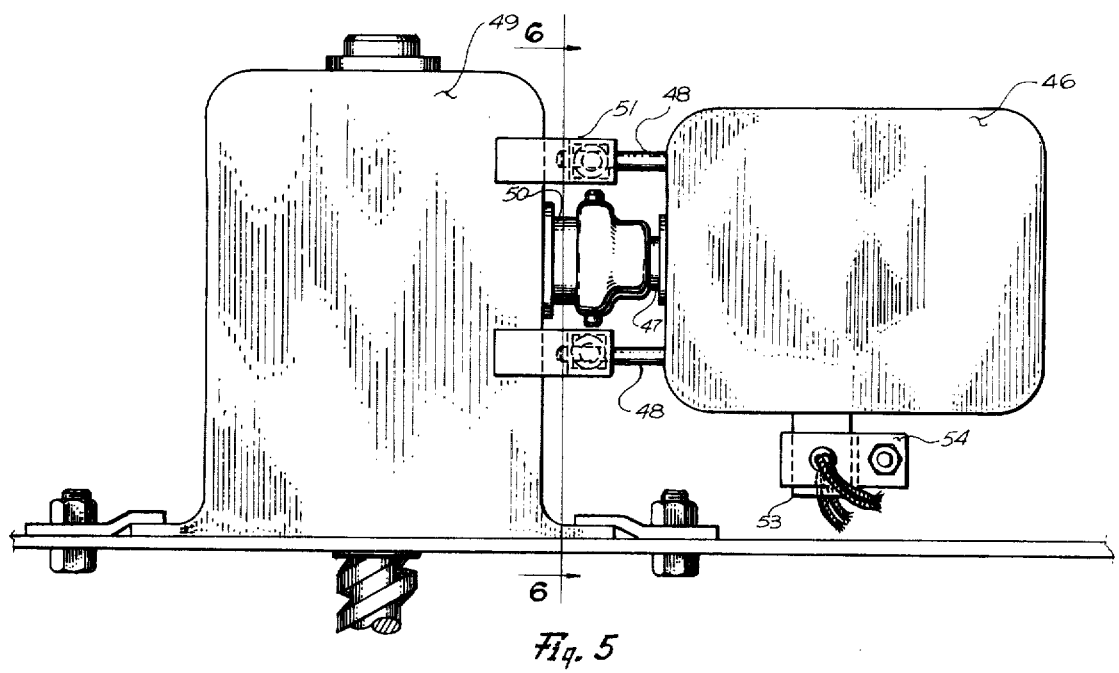
FIG. 5 is a top view in the direction of arrows 5—5 of the motor, gear box and drive shaft assembly.

The shuttle bar is attached to the rear glider plate in a manner whereby shuttle centering slots 9 (FIG. 3) in the glider plate 8 allow for centering of the shuttle between the guide rails with the shuttle centering screws 10 (FIG. 3). At the center of the shuttle in this embodiment is an internally threaded nut 2 fastened to the shuttle with drive nut fastening screws 3, which in turn is engaged to an outwardly threaded shaft 1 located in that portion of the housing rearward of the opening. The threaded shaft is rotably operated by a reversible motor 46 connected to the shaft through a gear box 49.

The hinges 14 connecting the rear cover edge to the rear glider plate are so assembled and adjusted that, in the cover's fully closed position, the inside angle between the upper and middle hinge sections form an angle less than 90°. See FIG. 3 for closed position. In this position the downward pressure exerted by the weight of the panel and the compression of the rear seal between the rear seal support and the underside of the vehicle roof tends to put a forward force on the lower hinge section, thus keeping the cover in its closed position without the need for further forward pressure on the shuttle and rear glider plates. Therefore, the cover lift device is essentially self-locking. It is to be noted that other sliding covers, in their closed position, tend to exert a continuous force in the direction of their opening movement, usually as a result of spring loading, thus requiring the cover transport system to exert a continuous locking force against the cover in its fully closed position.

These same hinges are so adjusted that in the cover's open position the upper angle of the lower two hinges is always less than 180°. See FIG. 4 for open position. In this way a forward movement of the shuttle exerts a forward and upward force on the middle hinge section and on the rear cover edge to which the upper hinge section is attached.

To control and prevent untimely upward movement of the rear cover edge when forward force is applied to the hinges by the shuttle, a sliding cam 17 is provided at the outer vertical edge of the rear glider plate. This cam is movable in a forward and rearward motion relative to the rear glider plate, sliding on two pins 21 (FIG. 4) attached to the rear glider plate's vertical edge along cam slots 18 (FIG. 3). The cam is given a forward position preference by a spring 23 connected to a pin 22 (FIG. 4) at the rear of the cam and to a tab 16 (FIG. 4) at the front of the rear glider plate. At its front, the cam is provided with a horizontal control notch 20 (FIG. 4) having a flat horizontal cam control face on its lower surface and a face angling up at approximately 10° in a forward direction at its upper surface. This notch engages a rear hold-down tab 30 fixedly attached to the underside of the rear cover support member by a rear hold-down arm 29 (FIG. 3). When the cover is in any open position, the cam effectively prevents any upward motion by the cover rear edge, and all forward force from the shuttle is translated through the rear glider plate and the hinge into forward force on the cover. The sliding cam is also provided with a vertical control face 19 (FIG. 4) above the notch, this face to guide the upward movement of the hold-down tab as the cover rear edge moves into its fully closed position.

A cam stop 41 laterally adjustable with cam stop adjustment screws 42, is attached to the housing in a manner allowing adjustment in a line parallel to the movement of the cover. The cam stop is adjusted so as to stop the forward motion of the cam with the rear glider plate exactly at the point where the cam control face is in position to guide the upward movement of the rear hold-down tab. This rear hold-down tab 30 is held by the cam notch 20 (FIG. 4) until the cover is in its full forward position. Only after the tab escapes the notch as a result of continuing forward movement of the rear glider plate while the cam is held stationary against the cam stop, further forward motion of the shuttle translates into essentially 100% upward motion of the upper hinge section and, consequently, of the rear cover edge. This is in contrast to other screw actuated sliding covers where the rear edge closing motion is a combination of forward and upward motion, with resulting sealing problems.

To open the cover, the shuttle is actuated in a rearward direction. As the rear glider plates are pulled rearward, the center section of the hinge pivots through and past a true vertical position, allowing the top hinge section to then fold downward and bringing the rear hold-down tab down along the cam face 19, while the cam is held stationary by the forward force of the cam spring pushing the cam against the cam stop. When the rear cover edge is in a fully down position the hold-down tab slides rearward into the cam notch 20, after which the cover may be moved further rearward into a partially or fully open position. The firm pressure of the cam notch onto the hold-down tab and the firm attachment of the rear glider plate on the guide rail prevent vibration noises from developing in the moving vehicle with the cover in an open position.

In the preferred embodiment a shuttle spacer block 5 (FIG. 4) attached to the end of the shuttle with shuttle block fastening screw 6 is provided to permit rigid fastening of the shuttle to the rear glider plate. A shuttle alignment plate 7 (FIG. 4) is attached to the upper face of the rear glider plate to be straddled by the shuttle so that one screw suffices to attach the shuttle to the rear glider plate.

The rear glider plate 8 moves back and forth parallel and slidably attached to the guide rail 24 by means of glide blocks 15 (FIG. 3) fastened to the inside vertical edge of the rear glider plate, said glide blocks engaging the outer edge of the guide rail.

The side glass support members 31 are U-shaped with the outer edge attached to the glass frame and the inner edge serving to hide the attachment means such as screws or rivets from view of the vehicle occupants.

A headliner frame 43 is provided to permit closing the vehicle's interior to the light coming through the glass cover. The headliner frame is fitted into slots provided on the inside edge of the guide rails. A plastic follow block 44 is mounted on the unthreaded front tip of the externally threaded shaft 1 in a manner that allows the shaft to rotate while the block is held stationary. This block fits into a follow block guide 45 attached at the center of the upper surface of the headliner frame in a line parallel to the threaded shaft. The follow block eliminates any tendency the threaded shaft end may have to whip from true center during operation of the sliding cover mechanism.

In this embodiment, the shuttle 4 is moved forward and rearward by an externally threaded shaft 1 rotably driven by a motor 46 through a suitable gear reduction arrangement, gear box 49. The motor shaft 47 (FIG. 5) is directly coupled to the drive-gear shaft 50 (FIG. 5) and the gear box is rigidly fastened to the rear edge of the housing at its center. This arrangement allows the motor body to turn around its shaft in the event that the torque developed by the motor exceeds the force applied to hold the motor body stationary. The motor body is fitted with two retention pins 48 (FIGS. 5, 6, 7) parallel to the motor drive shaft and mounted outboard of the shaft to the casing of the motor. The gear box is fitted with spring retainers 51 (FIGS. 5, 6, 7) on the side facing the motor, so that these retainers line up and cooperate with the retention pins on the motor. Suitably adjusted control springs 52 (FIG. 6) are provided in the spring retainers 51 (FIGS. 5, 6, 7) to maintain the motor body essentially stationary until the movement of the cover is impeded or stopped for any reason. When a torque build-up overcomes the pressure of the retention springs on the retention pins, the motor body actuates a normally closed switch, i.e. limit switch 54 (FIGS. 5, 6, 7), so as to interrupt the current to a relay coil which in turn will interrupt the current to the motor. Thus the system will shut itself off and cycle until the operator releases the control switch. This limit switch system will work equally well in both directions of cover movement. If desired, a greater retention spring pressure can be applied in one direction than in the other. It is equally feasable to use reed switches as limit switches, the reed switches being activated by the varying proximity of the magnet field of the rotating motor. Simple damper devices may be added to the retention springs to control the effect of the motor starting torque on the limit switch systems.

Figure 6:
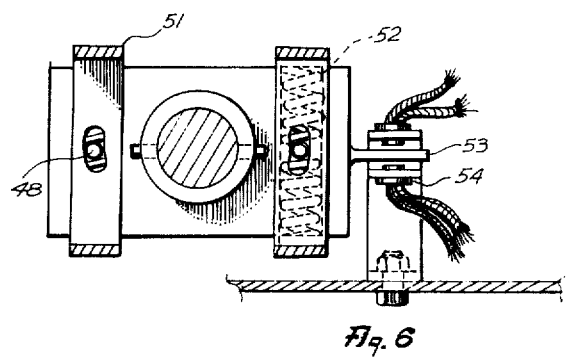
FIG. 6 and FIG. 7 are sectional views along arrows 6—6 of FIG. 5 showing the shut-off switch system.
Figure 7:
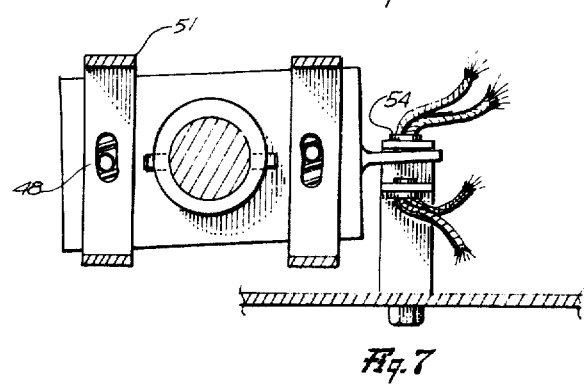

With the limit switch system described, the retention springs will return the motor body to a neutral position whenever power is turned off, and any residual pressure on the gear train will thereby be removed. Force is applied to the gear system only while the motor is working. FIG. 6 shows the on-position and FIG. 7 the off-position.

It will be appreciated that while a glass cover or other transparent or translucent sheet is employed as the preferred embodiment, a metal or otherwise opaque cover could be substituted for the glass cover described in this invention, if desired.

Likewise, the shuttle's forward and rearward movement could, instead of by screw means as described, be actuated by known means using a cable at the center rear of the shuttle, or a pair of cables attached to the outer ends of the shuttle; in either case, the unique mechanism controlling the movement of the cover and the means by which the cover is fastened to and adjusted in the housing would be equally effective. Further, the limit switch system on the motor body as described would be equally effective if coupled to a motor used to drive a cable instead of a threaded shaft.

While the preferred embodiment of the invention has been set forth hereinabove, it is not intended to limit the inventions solely thereto, but to include all of the variations and modifications within the scope and spirit of the invention. For example, the driving means may be hydraulic or pneumatic in operation, the front and rear glider plates may be any suitable support means, and many other variations within the skill of the art.

We claim:

1. A sliding roof arrangement for a vehicle having an opening in the roof thereof comprising:
   a housing, said housing containing guide rails longitudinally positioned along the outer edges of the opening in the housing, cam stops attached outwardly of said guide rails to said housing, and a cover movable on cover support means slidably attached to said guide rails and capable of effecting a closed and an open position of said cover in said roof opening;

cams slidably attached to said cover support means as a cover support means-cam combination, an operating mechanism for moving said cover, said operating mechanism applied from the rear of the housing to the cover through a movable cross member separated from and rearward of the cover and attached to the support means-cam combination, said cover support means-cam combination capable of sliding relative to each other by permitting forward motion to the said cover support means after the cam stop contacts the cam, said cover support means-cam combination hingably attached to the rear of the cover;

said cams containing frontal notches capable of engaging projecting tabs attached to the rear and underside of said cover, said cams, upon contacting said cam stops, being capable of disengaging the projecting tabs from said frontal notches, thus allowing said support means to hingably lift said cover to seal the roof opening.

2. The sliding roof arrangement of claim 1 where the ɔver support-cam combination comprises a cover support containing a component having a top horizontal face and a side vertical face, said vertical face having means of attachment to said cam, said cam capable of sliding along said means of attachment, and an elastic means joining the cam to the vertical face of said component, said combination permitting forward motion to said cover support means after the cam stop contacts said cam.

3. The sliding roof arrangement of claim 1 containing a frontal bar on front cover support means positioned on said guide rails, said frontal bar attached to the front of said cover, and said frontal bar useful in positioning the cover relative to the vehicle roof, housing and guide rails;

said frontal bar having adjustable means for attaching to the front cover support means, and said frontal bar having adjustable means for vertically attaching to and adjusting the cover to permit alignment of the cover with the roof opening.

4. The sliding roof arrangement of claim 2 containing a frontal bar on front cover support means positioned on said guide rails, said frontal bar attached to the front of said cover, and said frontal bar useful in positioning the cover relative to the vehicle roof, housing and guide rails;

said frontal bar having adjustable means for attaching to the front cover support means, and said frontal bar having adjustable means for vertically attaching to and adjusting the cover to permit alignment of the cover with the roof opening.

5. The sliding roof arrangement of claim 1 where the operating mechanism contains the motor-safety switch combination which comprises a rotatable motor, and at least one shut-off switch, said motor mounted so as to be non-rotatable until a predetermined torque is reached, but which rotates when said predetermined torque is exceeded, so as to activate a shut-off switch for said motor.

6. The sliding roof arrangement of claim 2 where the operating mechanism contains the motor-safety switch combination which comprises a rotatable motor, and at least one shut-off switch, said motor mounted so as to be non-rotatable until a predetermined torque is reached, but which rotates when said predetermined torque is exceeded, so as to activate a shut-off switch for said motor.

7. The sliding roof arrangement of claim 3 where the operating mechanism contains the motor-safety switch combination which comprises a rotatable motor, and at least one shut-off switch, said motor mounted so as to be non-rotatable until a predetermined torque is reached, but which rotates when said predetermined torque is exceeded, so as to activate a shut-off switch for said motor.

8. The sliding roof arrangement of claim 4 where the operating mechanism contains the motor-saftey switch combination which comprises a rotatable motor, and at least one shut-off switch, said motor mounted so as to be non-rotatable until a predetermined torque is reached, but which rotates when said predetermined torque is exceeded, so as to activate a shut-off switch for said motor.

9. A sliding roof arrangement for a vehicle having an opening in the roof thereof comprising a housing, said housing containing guide rails longitudinally positioned along the outer edges of the opening in the housing, a cover movable on front and rear cover support means slidably attached to said guide rails and capable of effecting a closed and an open position of said cover in said roof opening, an operating mechanism for moving said cover, a frontal bar on front cover support means positioned on said guide rails, said frontal bar attached to the front of said cover, and said frontal bar useful in positioning the cover relative to the vehicle roof, housing and guide rails;

said frontal bar having adjustable means for attaching to the front cover support means, and said frontal bar having adjustable means for vertically attaching to and adjusting the cover to permit alignment of the cover with the roof opening.

* * * * *